United States Patent
Man

(10) Patent No.: US 8,919,648 B2
(45) Date of Patent: Dec. 30, 2014

(54) BARCODE AND RFID READING APPARATUS

(71) Applicant: Megaviz Limited, Hong Kong (HK)

(72) Inventor: Chun Sing Matthew Man, Hong Kong (HK)

(73) Assignee: Megabyte Limited, Hong Kong (HK)

( * ) Notice: Subject to any disclaimer, the term of this patent is extended or adjusted under 35 U.S.C. 154(b) by 0 days.

(21) Appl. No.: 14/034,555

(22) Filed: Sep. 24, 2013

(65) Prior Publication Data

US 2014/0084064 A1 Mar. 27, 2014

Related U.S. Application Data

(60) Provisional application No. 61/704,571, filed on Sep. 24, 2012.

(51) Int. Cl.
*G06K 7/00* (2006.01)
*G06K 7/10* (2006.01)
*G06K 7/08* (2006.01)

(52) U.S. Cl.
CPC .............. *G06K 7/0004* (2013.01); *G06K 7/089* (2013.01)
USPC ...... 235/440; 235/435; 235/439; 235/462.45; 235/472.01

(58) Field of Classification Search
CPC ... G06K 7/0004; G06K 7/10; G06K 7/10544; G06K 7/10821; G06K 7/1404; G06K 9/00; G06K 9/20; G06K 9/22; G06K 9/228
USPC .................... 235/435, 439, 440, 454, 462.01, 235/462.46, 472.01, 472.02
See application file for complete search history.

(56) References Cited

U.S. PATENT DOCUMENTS

| 6,264,106 | B1 | 7/2001 | Bridgelall |
| 7,631,809 | B2* | 12/2009 | Mott .............................. 235/440 |
| 8,016,194 | B2* | 9/2011 | Hause et al. .................. 235/385 |
| 2006/0208086 | A1* | 9/2006 | Rudeen et al. ........... 235/472.01 |
| 2007/0152058 | A1* | 7/2007 | Yeakley et al. ........... 235/462.01 |
| 2007/0210159 | A1* | 9/2007 | Mott et al. ..................... 235/435 |
| 2008/0136591 | A1 | 6/2008 | Calvarese |
| 2009/0289116 | A1* | 11/2009 | Copeland et al. ............. 235/440 |
| 2010/0072280 | A1* | 3/2010 | McGill et al. ............ 235/462.13 |
| 2010/0217723 | A1* | 8/2010 | Sauerwein et al. ........... 705/337 |

OTHER PUBLICATIONS

Search Report of counterpart European Patent Application No. 13185671.8 issued on Jan. 14, 2014.

* cited by examiner

*Primary Examiner* — Thien M Le
*Assistant Examiner* — April Taylor

(57) ABSTRACT

A barcode and RFID reading apparatus includes: a micro-controller; at least a RFID antenna configured to detect a RFID tag in a first area proximate to the reading apparatus; a RFID reader connected to the at least one antenna and controlled by the micro-controller, the RFID reader being configured to receive a RFID tag data from the at least one antenna and send the RFID tag data to the micro-controller; and a barcode reader controlled by the micro-controller, the barcode reader being configured to detect a barcode in a second area proximate to the reading apparatus and send a barcode data from the barcode to the micro-controller; the micro-controller is configured to check whether the barcode reader or the RFID reader ends a data-reading process; if one reader ends the data-reading process, the micro-controller switches off the one and switches on the other.

12 Claims, 6 Drawing Sheets ent application. And it designs with operation mode switching through trigger button sequence and barcode or RFID tag scanning.

BARCODE AND RFID READING APPARATUS

CROSS-REFERENCE TO RELATED APPLICATIONS

This application claims priority of U.S. provisional application No. 61/704,571, filed on Sep. 24, 2012; the entire contents of which are hereby incorporated by reference.

FIELD OF THE PATENT APPLICATION

The present patent application generally relates to barcode and radio frequency identification (RFID) technologies and more specifically to a barcode and RFID (radio frequency identification) reading apparatus. And it designs with operation mode switching through trigger button sequence and barcode or RFID tag scanning.

BACKGROUND

A barcode is an optical machine-readable representation of data relating to the object to which it is attached. It can be represented data by varying the widths and spacings of parallel lines as linear or one-dimensional (1D), or by rectangles, dots, hexagons and other geometric in two dimensional patterns (2D). The main functions of bar coding are accuracy and speed. Scanning is much faster than manually entering the series of numbers into a computer with a keyboard or number pad. Barcode system is well-development technology and lower in cost of readers and barcode tags. It is common and relatively standard tools in modern life, specifically, inventory, point-of-sale, stock-take and etc.

RFID systems are being utilized in a great quantity in a multitude of applications. One of the common areas for RFID implementation is product identification, for inventory or for sales. The bar code scanner technology is slowly being replaced by RFID technology. In the simplest of applications, a passive RFID transponder, commonly called a tag or a card, is placed on an object that is to be identified. A RFID reader is then used to obtain information from the tag. The reader, being powered by a power source, typically has a transceiver to transmit and receive signals. The tag also has a transceiver to receive the signal from the reader and to transmit a response back to the reader. The tag is generally passive and powered by the induced electromagnetic field.

The reader is powered and generates a magnetic field from its antenna. When the reader and the tag are within close proximity of each other, the generated magnetic field from the reader is induced into the tag. The tag uses this coupled energy to power its circuitry. The reader transmits an interrogating signal to the tag, and the tag transmits a signal back to the reader in response to the interrogation. The tag may be placed on an item and the response from the tag may be used to simply identify the item.

RFID systems may use active tags which carry their own source of power such as a battery, or passive tags which contain no source of power and instead rely entirely on energy radiated by the reader. Passive tag readers continually or periodically search for the presence of passive tags in the vicinity of the reader by transmitting energy which will activate any tag present. A passive tag does not announce its presence unless activated by the reader.

SUMMARY

The present patent application is directed to a barcode and RFID reading apparatus. The barcode and RFID reading apparatus includes: a micro-controller; at least a RFID antenna configured to detect a RFID tag in a first area proximate to the reading apparatus; a RFID reader connected to the at least one antenna and controlled by the micro-controller, the RFID reader being configured to receive a RFID tag data from the at least one antenna and send the RFID tag data to the micro-controller; and a barcode reader controlled by the micro-controller, the barcode reader being configured to detect a barcode in a second area proximate to the reading apparatus and send a barcode data from the barcode to the micro-controller; the micro-controller is configured to check whether the barcode reader or the RFID reader ends a data-reading process; if the barcode reader ends the data-reading process, the micro-controller switches off the barcode reader and switches on the RFID reader; and if the RFID reader ends the data-reading process, the micro-controller switches off the RFID reader and switches on the barcode reader.

The barcode and RFID reading apparatus further includes an interface to an external host; the micro-controller is configured to transmit the RFID tag data and/or the barcode data to the external host by the interface.

The interface may be communicated to the external host through a communication link based on a compromised dada exchange protocol.

The RFID tag data and/or the barcode data may be sent to the external host through wired or wirelessly data connection.

The micro-controller may be a programmable micro-controller.

The micro-controller includes at least a processor.

The processor may be configured to monitor any changes in the detection of the RFID tag or the barcode relative to a prior interrogation.

The reading apparatus may be configured to start processing when detecting a connection to a host.

The barcode reader may be configured to end a scanning mode process after capturing a data or after a period of time if no data is being read.

The RFID reader may be configured to continuously read the RFID tag dada before receiving a command to interrupt.

BRIEF DESCRIPTIONS OF THE DRAWINGS

DETAILED DESCRIPTION

Reference will now be made in detail to a preferred embodiment of the barcode and RFID reading apparatus disclosed in the present patent application, examples of which are also provided in the following description. Exemplary embodiments of the barcode and RFID reading apparatus disclosed in the present patent application are described in detail, although it will be apparent to those skilled in the relevant art that some features that are not particularly important to an understanding of the barcode and RFID reading apparatus may not be shown for the sake of clarity.

Furthermore, it should be understood that the barcode and RFID reading apparatus disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
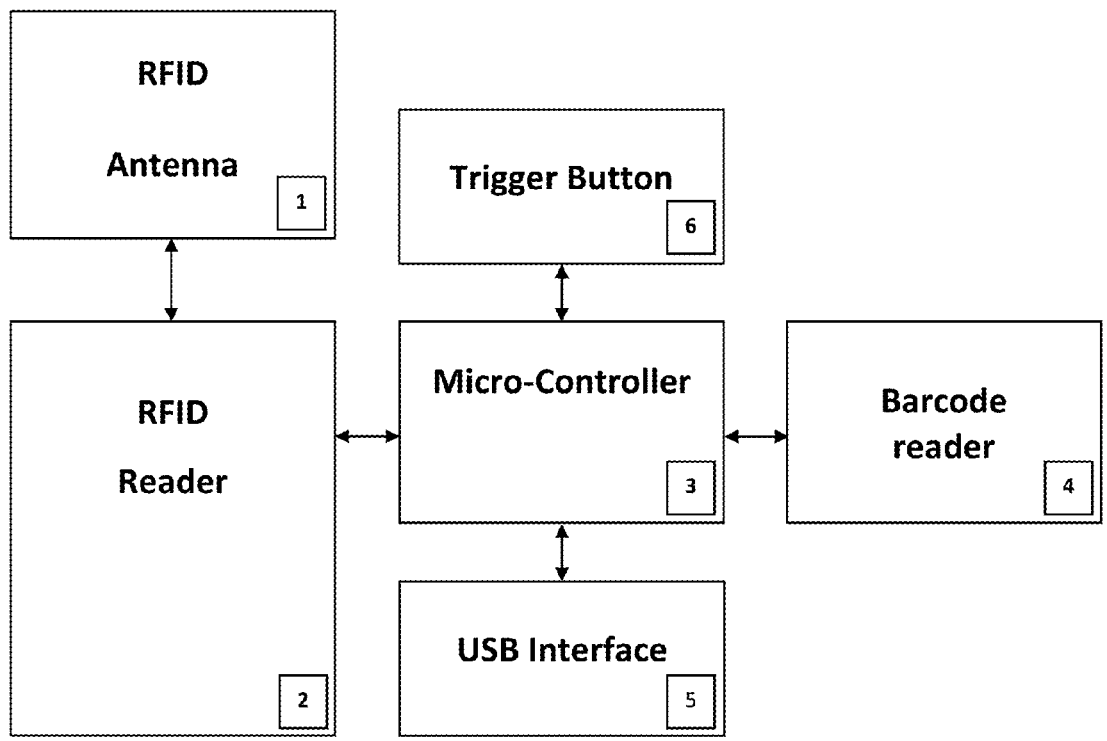
FIG. 1 illustrates a block diagram of a barcode and RFID reading apparatus according to an embodiment of the present patent application.

FIG. 1 illustrates a block diagram of the barcode and RFID reading apparatus according to an embodiment of the present patent application. The Barcode and RFID reading apparatus includes a RFID antenna 1, a RFID reader 2, a micro-controller 3, a barcode reader 4, an interface to host 5 and a user input trigger interface 6. The RFID antenna 1 is connected to the RFID reader 2. The connected antenna is configured to detect a context of any RFID tags in response to interrogation by the Barcode and RFID reading apparatus. The programmable micro-controller 3 controls the RFID reader 2 on the read cycle. In response to the tag's information feedback, the RFID reader 2 is configured to query the tags in air so as to send the tag information back to the micro-controller 3. As a result, information of the RFID tags captured by the RFID reader 2, controlled by the micro-controller 3, is communicated to an external host device through a communication link based on a compromised data exchange protocol and it listens to the user input trigger interface 6 for control operation mode. The data is sent through either wired or wirelessly data connection.

Figure 2:
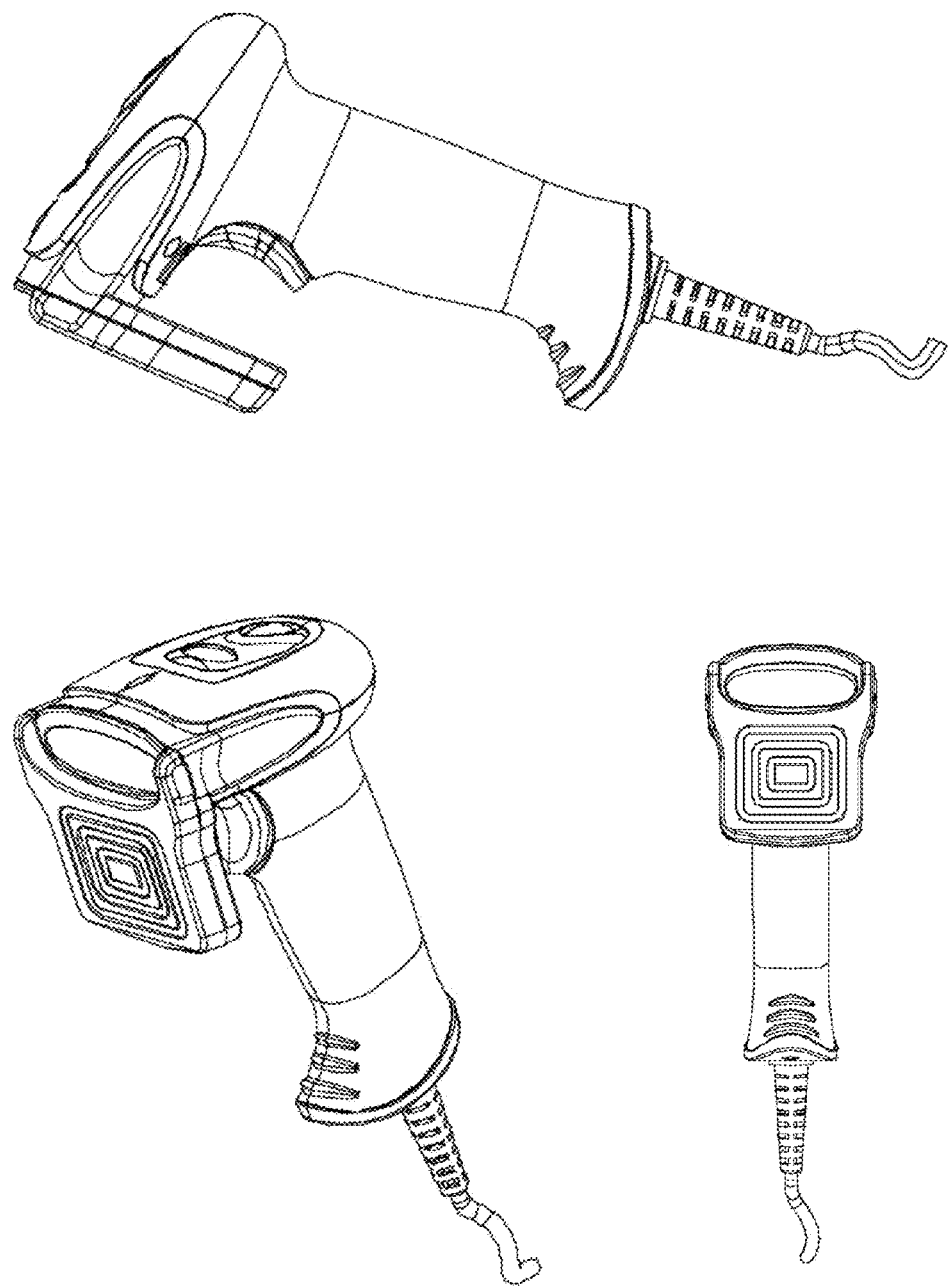
FIG. 2 is an exterior view of the barcode and RFID reading apparatus illustrated in FIG. 1.

FIG. 2 is an exterior view of the Barcode and RFID reading apparatus illustrated in FIG. 1. The Barcode and RFID reading apparatus is embedded with RFID antenna 1, RFID reader 2, and barcode reader 4. It is configured to detect any RFID tags or barcodes in an area proximate to the device in response to interrogations by the Barcode and RFID reading apparatus. At least one processor included in the micro-controller 3 is configured to monitor any changes in the detection of the RFID tags or barcodes in the area proximate to the device relative to a prior interrogation to determine whether the data of the device has changed.

Figure 3:
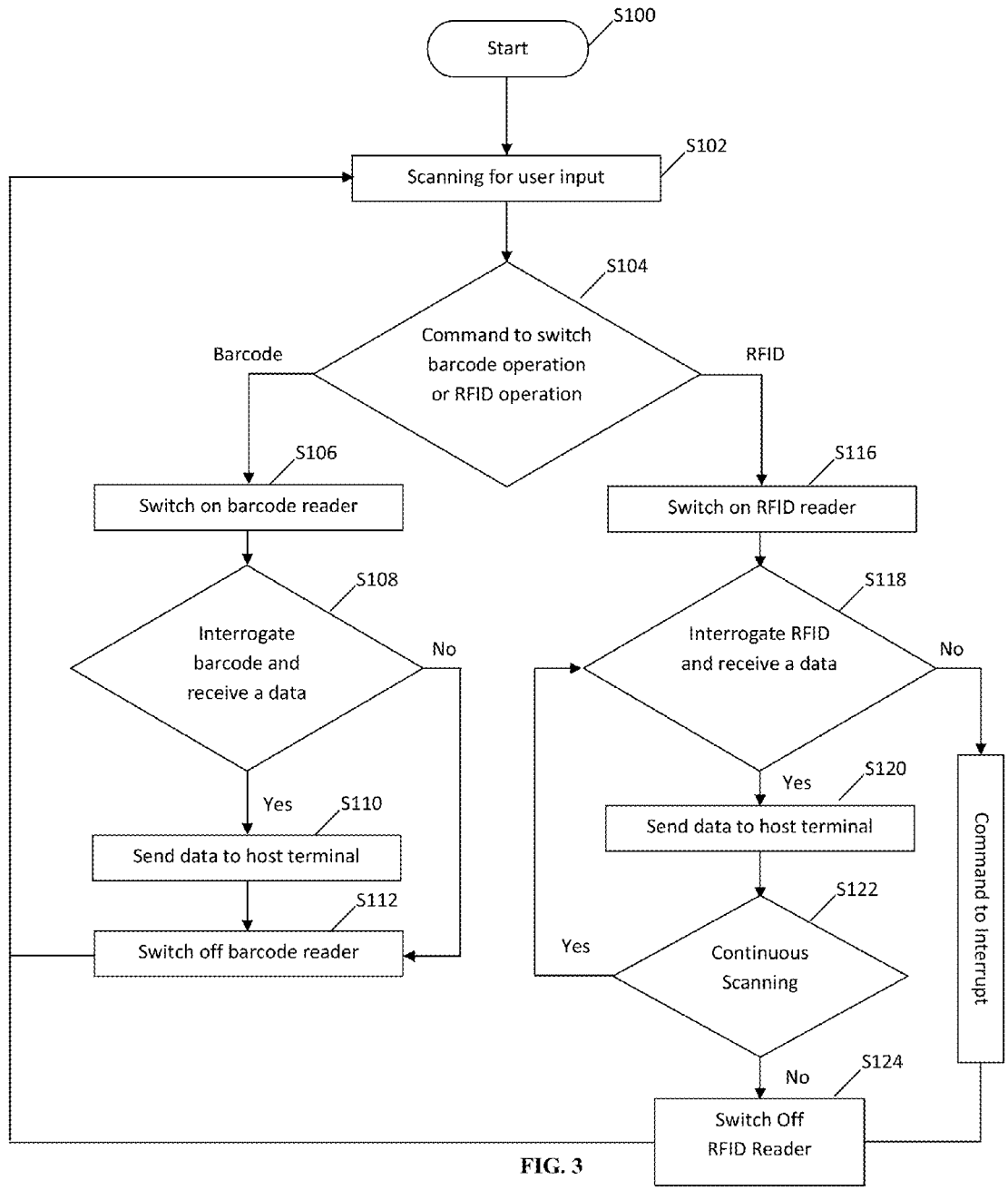
FIG. 3 is a flow chart of the operation mechanism of the barcode reader mode or RFID reader mode illustrated in FIG. 1.

FIG. 3 is a flow chart of the operation mechanism of the Barcode and RFID reading apparatus illustrated in FIG. 1. Referring to FIG. 3, when a host is connected to the Barcode and RFID reading apparatus, the Barcode and RFID reading apparatus starts its processing (S100). The Barcode and RFID reading apparatus will then start scanning for user input and processing the command if any (S102). The Barcode and RFID reading apparatus can be commanded to either barcode mode or RFID reader mode (S104).

The barcode operation mode or RFID operation mode is controlled by a trigger button, either single click or continuous double click in a single button design. For example, single click to trigger barcode operation and double click for RFID operation mode, and vice versa. And the mode operation can also be commanded through barcode or RFID tag.

In barcode operation mode, barcode reader 4 will be commanded to switch on (S106). It then reads and returns any barcode data being read to a host terminal. To protect the barcode reader, the scanning mode process will be automatically terminated after capturing a data or after a period of time if no data is being read. At step S108, barcode reader 4 transmits an interrogating signal and receives a data from a barcode in an area (second area) proximate to the device in response to the interrogation. The received data is subsequently sent to a host terminal (S110). After the data is sent, or if no data is received at step S108, barcode reader 4 will be commanded to switch off (S112). It returns to scanning for user input status (S102).

In RFID operation mode, RFID reader 2 will be commanded to switch on (S116). It then reads and returns any RFID tag data being read to a host terminal (S118 and S120). At step S118, RFID reader 2 transmits an interrogating signal and receives a data from a RFID tag in an area (first area) proximate to the device in response to the interrogation. At step S120, The received data is subsequently sent to a host terminal. Without interrupt, RFID reader 2 will continuously read (S122) and then return to the step S118. When commanded to interrupt, RFID reader 2 will end the reading process. After the reading process is end, RFID reader 2 will be commanded to switch off (S124). It returns to scanning for user input status (S102).

Figure 4:
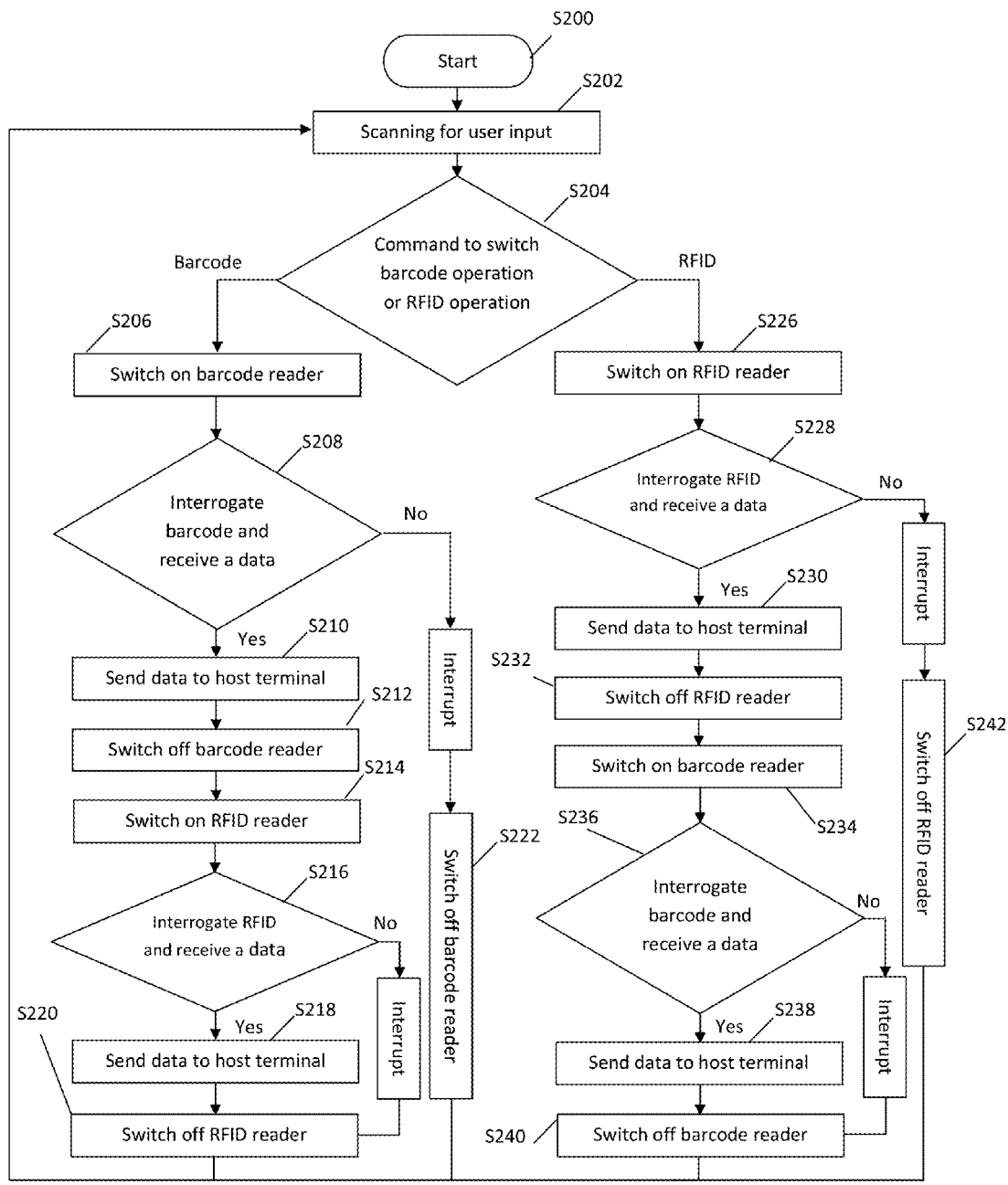
FIG. 4 is a flow chart of the operation mechanism of the barcode to/from RFID reader mode auto-switching illustrated in FIG. 1.

FIG. 4 is a flow chart of the auto switching operation mechanism of the Barcode and RFID reading apparatus illustrated in FIG. 1. Referring to FIG. 4, when a connection to a host is established, the Barcode and RFID reading apparatus starts processing (S200). The Barcode and RFID reading apparatus will then start scanning for user input and processing the command if any (S202). The Barcode and RFID reading apparatus can be commanded to either barcode-to-RFID mode or RFID-to-barcode mode (S204).

In barcode-to-RFID operation mode, barcode reader 4 will be commanded to switch on first (S206). To protect the barcode reader, the scanning mode process will be automatically terminated after capturing a data or after a period of time if no data is being read. At step S222, barcode reader 4 will be commanded to switch off. Then, it returns to scanning for user input status (S202). If a barcode data is captured, the captured barcode data is sent to a host terminal and barcode reader 4 is switched off (S208, S210 and S212). Then, RFID reader 2 will be switched on for RFID operation (S214). It reads and returns a RFID tag data to a host terminal (S216 and S218). Without interrupt, it will continue the processes of the steps S216 and S218 until it is commanded to interrupt and end the scanning process. RFID reader 2 will be commanded to switch off at step S220. It returns to scanning for user input status (S202).

In RFID-to-barcode operation mode, RFID reader 2 will be commanded to switch on first (S226). If no interrupt, it will read and return a RFID tag data to a host terminal (S228 and S230). This process will continue until RFID reader 2 is commanded to interrupt. Then, RFID reader 2 will be commanded to switch off (S242). It then returns to scanning for user input status (S202). Without interrupt, after a RFID tag data is captured and sent to the host terminal, RFID reader 2 will be commanded to switch off (S232). Then, barcode reader 4 will be switched on for barcode operation (S234). It reads and returns a barcode data to the host terminal (S236 and S238). To protect the barcode reader, the scanning mode process will be automatically terminated after capturing a data or after a period of time if no data is being read. Barcode reader 4 will then be switched off (S240). It returns to scanning for user input status (S202).

Figure 5:
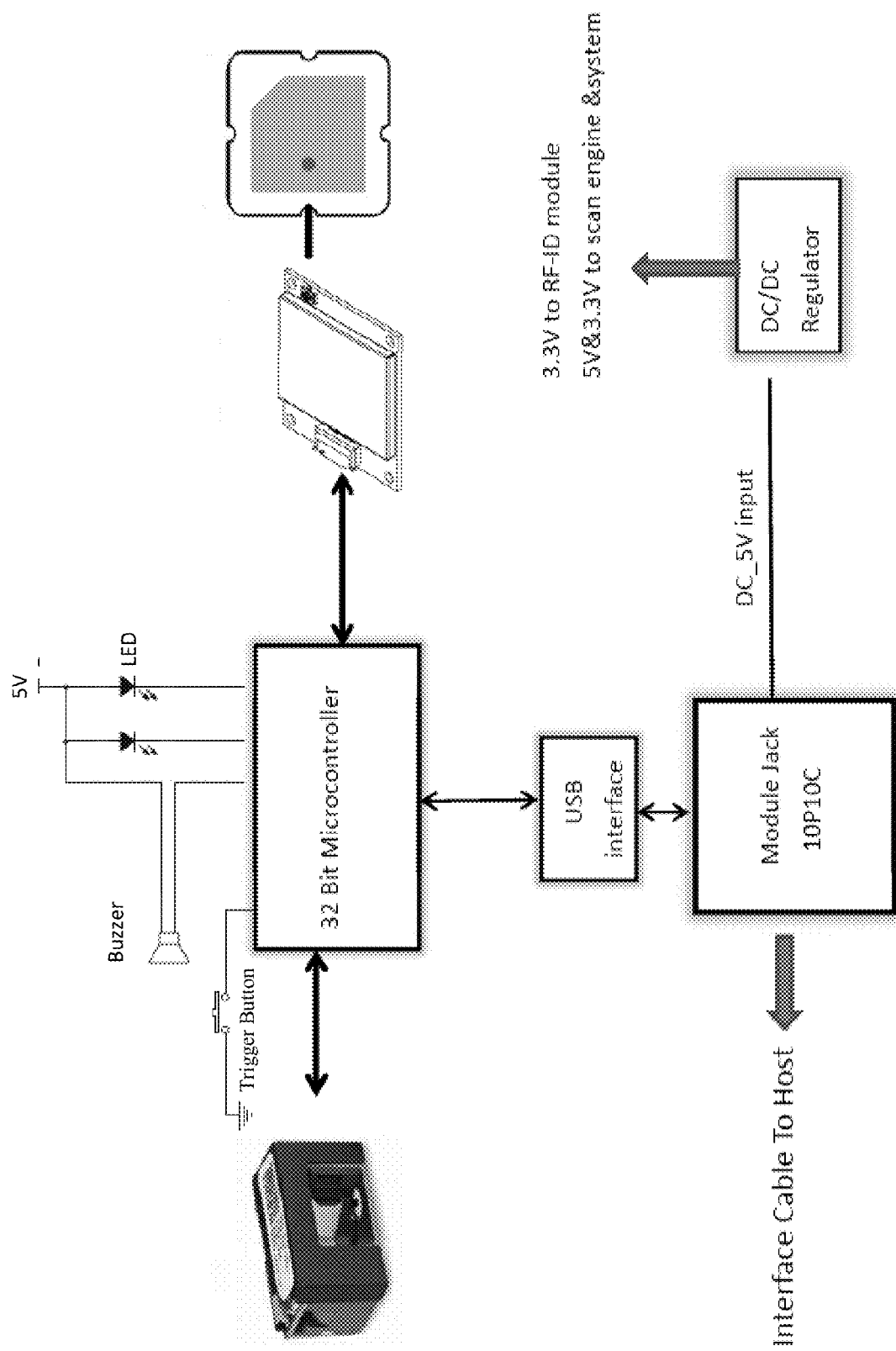
FIG. 5 shows a schematic circuit diagram for the UHF RFID reader and the micro-controller.

FIG. 5 is a circuit diagrams of the Barcode and RFID reading apparatus illustrated in FIG. 1. Referring to FIG. 5, Micro-controller 3 is a 32-bit micro-controller. Interface 5 is a USB interface. The Barcode and RFID reading apparatus also includes a buzzer and at least one LED. The buzzer is configured to indicate good-reading status of the reader by buzzing sound. LEDs are configured for displaying various working statuses of the reader by LED light.

Figure 6:
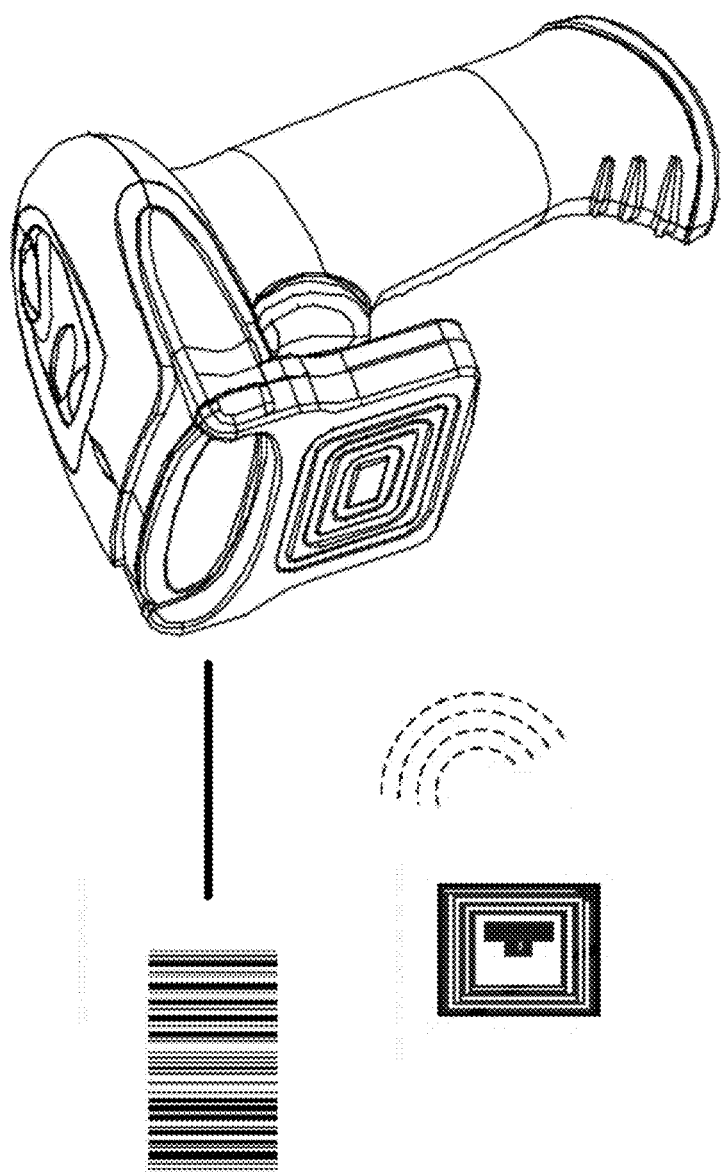
FIG. 6 illustrates an operation mode switching by scanning barcode and RFID tag of the barcode and RFID reading apparatus according to an embodiment of the present patent application.

FIG. 6 illustrates an operation mode switching by scanning barcode and RFID tag of the Barcode and RFID reading apparatus according to an embodiment of the present patent application.

The above embodiments of the present patent application provide a barcode and RFID reading apparatus. The device adopts the barcode and radio frequency identification (RFID) technologies so that the applicability of the device is improved. In addition, the device can meet most of the industrial requirements, being highly secure, durable, scalable, and reliable. Moreover, the device is a compact size to fit most packed, harsh and dusty working environment.

While the present patent application has been shown and described with particular references to a number of embodiments thereof, it should be noted that various other changes or modifications may be made without departing from the scope of the present invention.

What is claimed is:

1. A barcode and RFID reading apparatus comprising:
a micro-controller;
at least a RFID antenna configured to detect a RFID tag in a first area proximate to the reading apparatus;
a RFID reader connected to the at least one antenna and controlled by the micro-controller, the RFID reader being configured to receive a RFID tag data from the at least one antenna and send the RFID tag data to the micro-controller;
a barcode reader controlled by the micro-controller, the barcode reader being configured to detect a barcode in a second area proximate to the reading apparatus and send a barcode data from the barcode to the micro-controller; and
an interface to an external host;
wherein the micro-controller is configured to check whether the barcode reader or the RFID reader ends a data-reading process; if the barcode reader ends the data-reading process, the micro-controller switches off the barcode reader and switches on the RFID reader; and if the RFID reader ends the data-reading process, the micro-controller switches off the RFID reader and switches on the barcode reader;
wherein the micro-controller is configured to transmit the RFID tag data and/or the barcode data to the external host by the interface; the interface is communicated to the external host through a communication link based on a compromised data exchange protocol; the RFID tag data and/or the barcode data are sent to the external host through wired or wirelessly data connection; and
wherein the reading apparatus is configured to start processing when detecting a connection to the host; the barcode reader is configured to end a scanning mode process after capturing a data or after a period of time if no data is being read; the RFID reader is configured to continuously read the RFID tag data before receiving a command to interrupt.

2. A barcode and RFID reading apparatus comprising:
a micro-controller;
at least a RFID antenna configured to detect a RFID tag in a first area proximate to the reading apparatus;
a RFID reader connected to the at least one antenna and controlled by the micro-controller, the RFID reader being configured to receive a RFID tag data from the at least one antenna and send the RFID tag data to the micro-controller;
a barcode reader controlled by the micro-controller, the barcode reader being configured to detect a barcode in a second area proximate to the reading apparatus and send a barcode data from the barcode to the micro-controller; and
an interface to an external host;
wherein the micro-controller is configured to check whether the barcode reader or the RFID reader ends a data-reading process; if the barcode reader ends the data-reading process, the micro-controller switches off the barcode reader and switches on the RFID reader; and if the RFID reader ends the data-reading process, the micro-controller switches off the RFID reader and switches on the barcode reader;
wherein the micro-controller is a programmable micro-controller; the micro-controller comprises at least a processor; the processor is configured to monitor any changes in the detection of the RFID tag or the barcode relative to a prior interrogation; and
wherein the reading apparatus is configured to start processing when detecting a connection to the host; the barcode reader is configured to end a scanning mode process after capturing a data or after a period of time if no data is being read; the RFID reader is configured to continuously read the RFID tag data before receiving a command to interrupt.

3. A barcode and RFID reading apparatus comprising:
a micro-controller;
at least a RFID antenna configured to detect a RFID tag in a first area proximate to the reading apparatus;
a RFID reader connected to the at least one antenna and controlled by the micro-controller, the RFID reader being configured to receive a RFID tag data from the at least one antenna and send the RFID tag data to the micro-controller; and
a barcode reader controlled by the micro-controller, the barcode reader being configured to detect a barcode in a second area proximate to the reading apparatus and send a barcode data from the barcode to the micro-controller;
wherein the micro-controller is configured to check whether the barcode reader or the RFID reader ends a data-reading process; if the barcode reader ends the data-reading process, the micro-controller switches off the barcode reader and switches on the RFID reader; and if the RFID reader ends the data-reading process, the micro-controller switches off the RFID reader and switches on the barcode reader.

4. The barcode and RFID reading apparatus of claim 3 further comprising an interface to an external host; wherein the micro-controller is configured to transmit the RFID tag data and/or the barcode data to the external host by the interface.

5. The barcode and RFID reading apparatus of claim 4, wherein the interface is communicated to the external host through a communication link based on a compromised data exchange protocol.

6. The barcode and RFID reading apparatus of claim 5, wherein the RFID tag data and/or the barcode data are sent to the external host through wired or wirelessly data connection.

7. The barcode and RFID reading apparatus of claim 3, wherein the micro-controller is a programmable micro-controller.

8. The barcode and RFID reading apparatus of claim 7, wherein the micro-controller comprises at least a processor.

9. The barcode and RFID reading apparatus of claim 8, wherein the processor is configured to monitor any changes in the detection of the RFID tag or the barcode relative to a prior interrogation.

10. The barcode and RFID reading apparatus of claim 3, wherein the reading apparatus is configured to start processing when detecting a connection to a host.

11. The barcode and RFID reading apparatus of claim 3, wherein the barcode reader is configured to end a scanning mode process after capturing a data or after a period of time if no data is being read.

12. The barcode and RFID reading apparatus of claim 3, wherein the RFID reader is configured to continuously read the RFID tag data before receiving a command to interrupt.

* * * * *